(12) United States Patent
Mullett et al.

(10) Patent No.: US 7,456,611 B2
(45) Date of Patent: Nov. 25, 2008

(54) MULTI-CURRENT BATTERY CHARGER CIRCUIT AND METHOD THEREFOR

(75) Inventors: Charles E. Mullett, Santa Paula, CA (US); Jefferson W. Hall, Chandler, AZ (US)

(73) Assignee: Semiconductor Components Industries, L.L.C., Phoenix, AZ (US)

(*) Notice: Subject to any disclaimer, the term of this patent is extended or adjusted under 35 U.S.C. 154(b) by 531 days.

(21) Appl. No.: 11/200,789

(22) Filed: Aug. 11, 2005

(65) Prior Publication Data
US 2007/0035278 A1 Feb. 15, 2007

(51) Int. Cl.
*H01M 10/46* (2006.01)
(52) U.S. Cl. ....................................... 320/130
(58) Field of Classification Search ................. 320/124, 320/125, 130, 141, 160
See application file for complete search history.

(56) References Cited

U.S. PATENT DOCUMENTS 6,172,480 B1 * 1/2001 Vandelac ................... 320/125

6,605,978 B1 8/2003 Halamik et al.
2001/0001533 A1 * 5/2001 Stuck et al. ................. 320/150

OTHER PUBLICATIONS

Data Sheet, "MC33340, MC33342 Battery Fast Charge Controllers," Aug. 2004—Rev. 6, Semiconductor Components Industries, LLC., 14 pages.
Data Sheet, "NCP1835 Integrated Li-Ion Charger," Feb. 2005—Rev. 2, Semiconductor Components Industries, LLC, 16 pages.
Web Publication, "Switching Regulator saves power for NiMH Battery Charger," Jason Hansen et al,, PlanetAnalog, Oct. 23, 2000, http://www.planetanalog.com/.
"Switching Regulator Charges NiMH Batteries", Jason Hansen et al, Design Ideas, edn Magazine, www.ednmag.com, Dec. 21, 2000, pp. 95-96.
"Energy-Saving Chargers for Cordless Appliances", Charles E. Mullett, presented at the California Energy Commission Hearing on Oct. 13, 2004, in San Francisco.

* cited by examiner

*Primary Examiner*—Edward Tso
(74) *Attorney, Agent, or Firm*—Robert F. Hightower

(57) ABSTRACT

In one embodiment, a battery charger is configured to provide a normal charge current during a first time period and to supply a maintenance current after the first time period expires.

28 Claims, 8 Drawing Sheets

MULTI-CURRENT BATTERY CHARGER CIRCUIT AND METHOD THEREFOR

BACKGROUND OF THE INVENTION

The present invention relates, in general, to electronics, and more particularly, to methods of forming semiconductor devices and structure.

In the past, various circuits and methods were used to implement charging circuits for battery-powered appliances such as vacuum cleaners, power tools, and other cordless appliances. In many applications, the charging circuit and the battery were integrated into the battery-powered appliance. One typical implementation utilized a diode and a resistor in series as a simple and inexpensive battery charging circuit. Generally, these circuits were very inefficient and even consumed excessive power after the battery was completely charged.

Accordingly, it is desirable to have a battery charging circuit that is efficient, that has a low cost, and that may be integrated into a battery-powered appliance.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
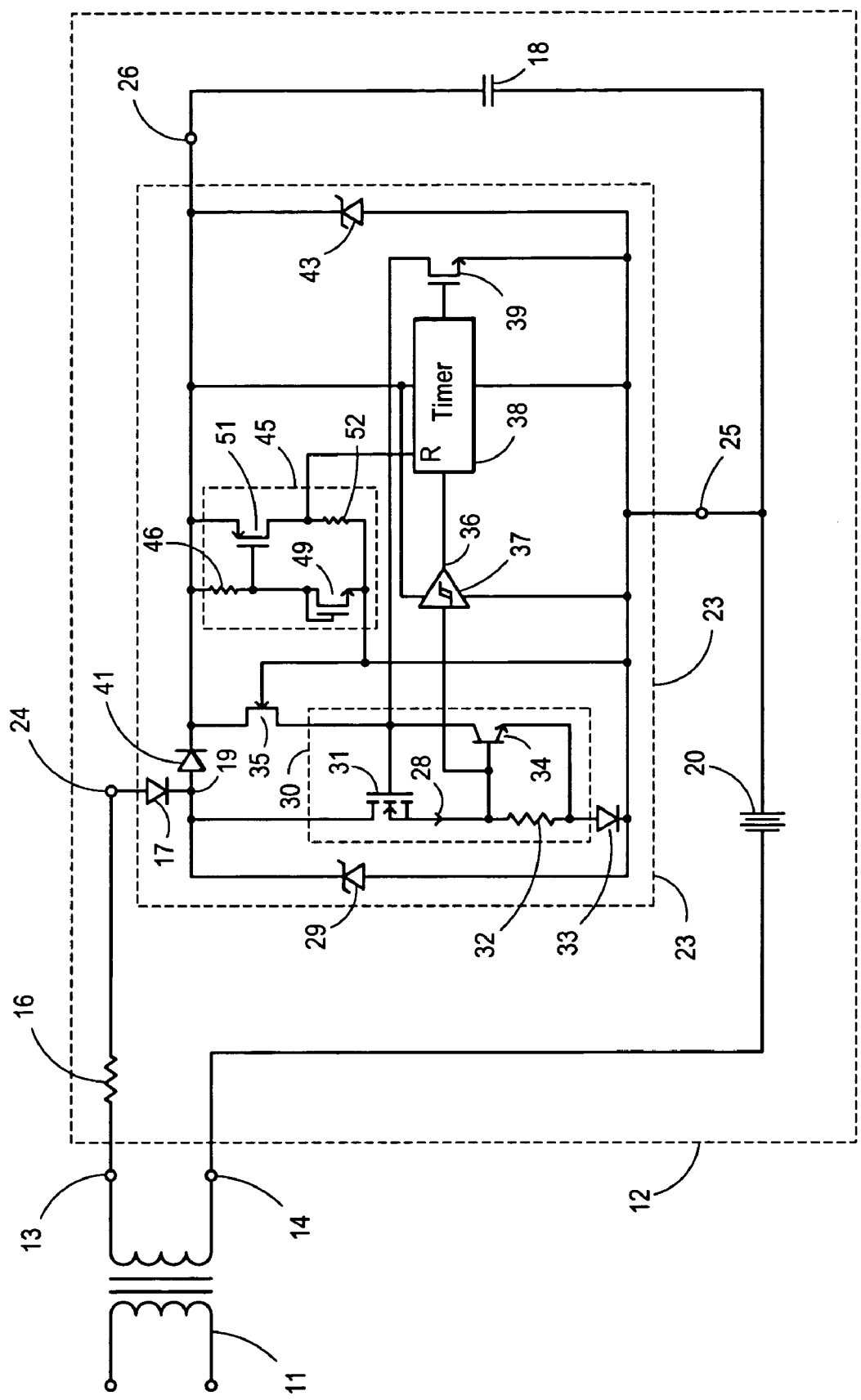
FIG. 1 schematically illustrates a portion of an embodiment of a charging system for a battery powered appliance in accordance with the present invention.

FIG. 1 schematically illustrates a portion of an exemplary embodiment of a charging system 10 having a portion that is integrated into a battery-powered appliance 12. Appliance 12 may be a power tool such as a battery-powered drill, a battery-powered flashlight, a battery-powered saw, a battery-powered vacuum cleaner, or the like. Appliance 12 typically has power input terminals 13 and 14 that are utilized to couple appliance 12 to a power source such as a transformer 11. Transformer 11 generally is used to receive power from a power source such as a household mains and reduce the source voltage level to a voltage level that is suitable for appliance 12. The voltage applied to transformer 11 generally is an ac voltage having a sine-wave waveform. Appliance 12 typically includes a rechargeable battery 20 that is used to power appliance 12 and a battery charging circuit or battery charger 23. Charger 23 usually is configured to include a power input terminal or input 24, a power return terminal or return 25, and an auxiliary power terminal 26. An optional resistor 16 may be connected in series between terminal 13 and power input terminal 24 of charger 23. Optional resistor 16 provides a current limiting function that limits the current supplied to charger 23. In most embodiments, transformer 11 has sufficient losses and impedances that resistor 16 generally is not required. An energy storage capacitor 18 may be coupled between terminal 26 and return terminal 25 to provide an alternate operating voltage source for charger 23, as will be seen further hereinafter.

Charger 23 is configured to apply a normal-charge current to battery 20 to rapidly charge battery 20, to disable the normal charging current after a battery 20 is charged for a given period of time, and thereafter to apply a maintenance current to keep battery 20 charged as long as appliance 12 is mated to transformer 11. The value of the normal-charge current generally is selected to be a certain portion (X) of the rated capacity (C) of the battery. The time used to charge the battery with the normal-charge current generally is no less than approximately the inverse of the portion (1/X). After the normal charging time, battery 20 is charged with the maintenance current that is at least equal to the discharge rate from the inherent losses of battery 20. The value of the normal charge current generally is about ten percent to fifty percent of the rate capacity (0.1 C to 0.5 C). In the preferred embodiment, the value of the normal charge current generally is about ten percent (0.1 C) of the rate capacity. It is also possible to charge batteries faster, but this usually requires monitoring the battery temperature and/or terminal voltage to prevent overheating. For example, if the rated capacity (C) of a battery is ten ampere-hours and the portion of the rated capacity is selected to be ten percent (0.1), then the value of the charging current is one ampere (10 ampere-hours times ten percent) and the amount of time the battery is charged at one ampere is ten hours (1/0.1). After the ten hours, the battery may be charged with the maintenance current such as a current of about five to thirty (5-30) milliamperes.

Charger 23 includes a normal-charge control circuit 30 that is configured to provide the normal-charge current to rapidly charge battery 20. Charger 23 also includes a current source transistor 35, a timing circuit or timer 38 that controls the amount of time that charger 23 provides the normal-charge current, a reset circuit 45, a maintenance circuit that is utilized to keep battery 20 charged, and a rectifying diode 17 that rectifies the ac voltage from terminal 13 to provide a half-wave rectified waveform for charger 23. The maintenance circuit includes transistors 35 and 39. Timer 38 is used to control the state of charger 23 and to switch between the normal-charge mode and the maintenance charge mode. Timer 38 times the amount of time that charger 23 supplies the normal-charge current and sets a control signal that controls charger 23 to enter the maintenance charge mode. Thus, the control signal sets the operating state of charger 23. Timer 38 may be implemented as any of a variety of timers including a digital counter such as an asynchronous counter that increments responsively to a clock signal that is applied to the counter. Such timers are well known to those skilled in the art. Reset circuit 45 forms a reset signal that is utilized to hold timer 38 reset until charger 23 begins charging battery 20. For the exemplary embodiment illustrated in FIG. 1, circuit 45 includes a pull-down resistor 52, and a comparator that includes a transistor 51, threshold diodes 47 and 48, a current source transistor 49, and a resistor 46. Another example of a suitable low power circuit for reset circuit 45 is disclosed in U.S. Pat. No. 6,605,978 issued to Halamik et al on Aug. 12, 2003 which is hereby incorporated herein by reference. Charger 23 also includes a disable switch implemented as a disable transistor 39, and a detector that includes a diode 33 and a comparator 37 that has an output 36. Normal-charge control circuit 30 includes a power transistor 31, a current sense resistor 32, and a current control transistor 34. Comparator 37 and timer 38 generally are formed with complementary metal oxide semiconductor (CMOS) circuits and manufacturing techniques in order to minimize the amount of power utilized by comparator 37 and timer 38. Such CMOS circuits and manufacturing techniques are well known to those skilled in the art. Charger 23 also typically includes an electrostatic discharge protection (ESD) circuit or ESD 29 that is connected to protect circuit 30 and an electrostatic discharge protection (ESD) circuit or ESD 43 that is connected to protect other portions of charger 23. Such ESD circuits are well known to those skilled in the art.

Figure 2:
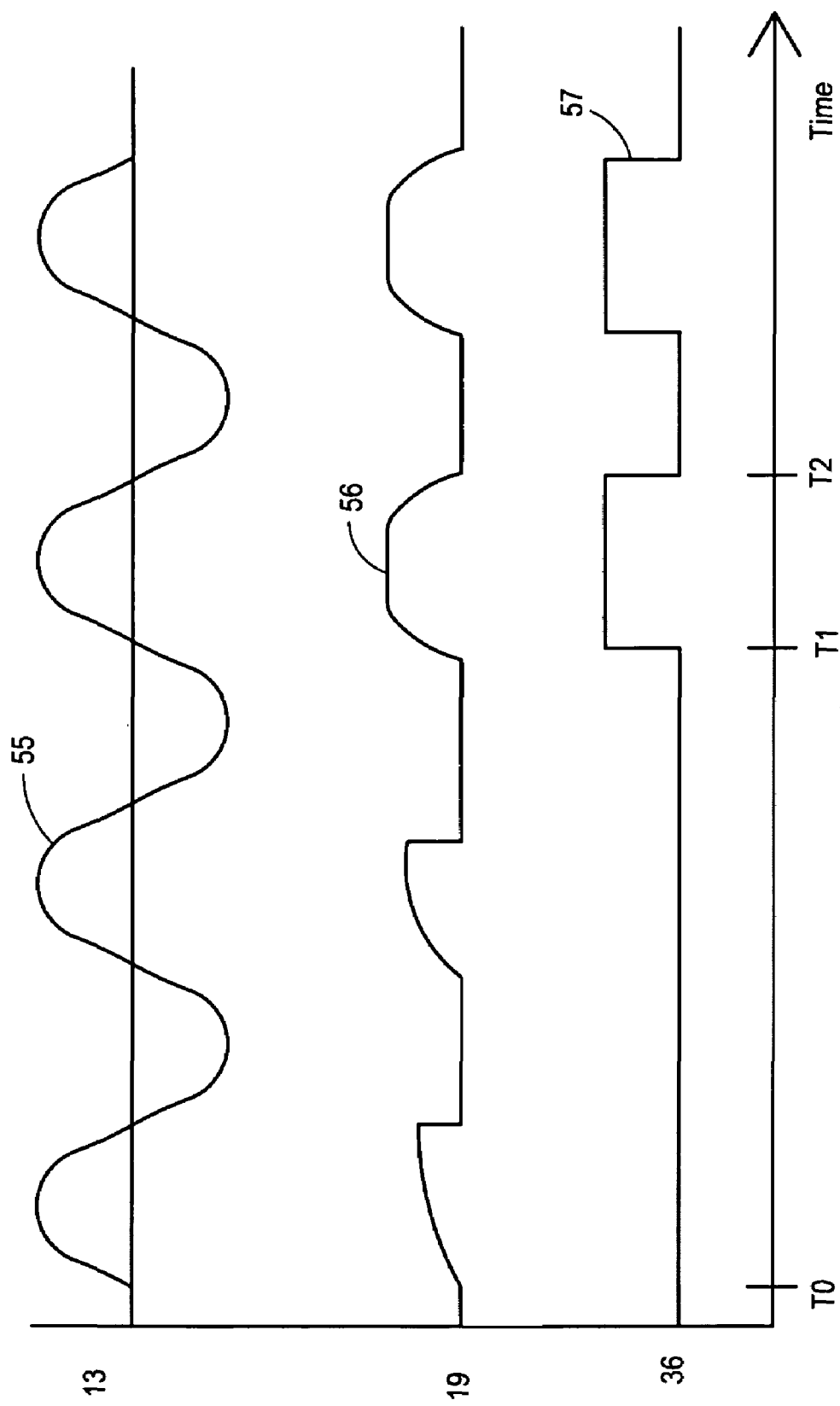
FIG. 2 is a graph having plots of signals at various points of the charging system of FIG. 1 in accordance with the present invention.

FIG. 2 is a graph having plots of signals at various points of system 10 and charger 23. The abscissa indicates time and the ordinate indicates increasing value of the signal of each plot. A plot 55 illustrates the voltage between terminals 13 and 14. A plot 56 illustrates the voltage at the cathode of diode 17. A plot 57 illustrates the output signal on output 36 of comparator 37. This description has references to both FIG. 1 and FIG. 2.

Assuming that appliance 12 is disconnected from transformer 11, battery 20 typically is in a certain state of charge. In order to recharge battery 20, appliance 12 is mated to transformer 11 at terminals 13 and 14 as illustrated in FIG. 1. Prior to the mating, capacitor 18 is discharged. Upon mating appliance 12 to terminals 13 and 14 as illustrated at a time T0, power is applied to terminal 24 and current flows from terminal 24 through diodes 17 and 41 to begin charging capacitor 18. While capacitor 18 is charging, circuit 30 is disabled until capacitor 18 charges approximately to the threshold voltage of circuit 30. The threshold voltage of circuit 30 is approximately equal to the saturation voltage of transistor 35 plus the threshold voltage of transistor 31 plus the threshold voltage of transistor 34 plus the forward drop of diode 33. Those skilled in the art will appreciate that transistor 35 may be replaced by other current source circuits such as a resistor. In the preferred embodiment, the threshold voltage of circuit 30 is approximately three volts (3 V). Additionally, while capacitor 18 is charging, a reset signal from the output of circuit 45 holds timer 38 reset until capacitor 18 charges to the threshold voltage of circuit 45. The threshold voltage of circuit 45 is approximately equal to the threshold voltage of transistor 51 plus the forward voltages of diodes 47 and 48 plus the threshold voltage of transistor 49. Capacitor 18 typically charges during one cycle of the input voltage on terminals 13 and 14, but may take more than one cycle in some embodiments.

At a time T1, capacitor 18 has been charged to the threshold voltage of circuits 30 and 45. The gate of transistor 51 is clamped to the voltage of the threshold voltage of transistor 49 plus the forward voltage of diodes 47 and 48. Current flows through resistor 46 to enable transistor 51 which pulls the reset signal output of circuit 45 high to release timer 38 and allow timer 38 to begin counting. The output of timer 38 is initially low and transistor 39 is disabled. Current source transistor 35 supplies a current that enables transistor 31. As illustrated by plot 56 at a time T1, the voltage on the cathode of diode 17 at a node 19 is a substantially a half-wave rectified waveform. As the voltage on terminal 24 increases from approximately zero at time T1, source transistor 35 provides a current to charge the gate of transistor 31 thereby enabling transistor 31. A normal charge current 28 flows through transistor 31, resistor 32, and diode 33 to charge battery 20. The value of current 28 supplied by transistor 31 is controlled by a control loop that includes resistor 32, transistor 34, transistor 35, and transistor 31. As current 28 flows through resistor 32, transistor 34 controls the value of the gate voltage of transistor 31 to maintain the value of current 28 to ensure that the voltage across resistor 32 is approximately equal to the base-emitter voltage of transistor 34. Thus, the value of current 28 through transistor 31 is kept substantially constant as the voltage on node 19 increases. In some embodiments, the control loop may be omitted and the normal charge current may be limited by the internal impedance of transformer 11.

Comparator 37 and diode 33 function together as a clock generator to provide a clock signal for clocking timer 38 that is synchronized to the cycle of the voltage between terminals 13 and 14. As the voltage on the cathode of diode 17 increases from approximately zero at time T1, the base voltage of transistor 34 also increases until the base-emitter voltage reaches the threshold Vbe of transistor 34. Comparator 37 receives the base voltage of transistor 34 and forms an output signal on output 36 that goes high and low responsively to the base voltage of transistor 34. Diode 33 provides an offset voltage to comparator 37 so that comparator 37 accurately detects the voltage on the base of transistor 34. As illustrated by plot 57, comparator 37 forces output 36 of comparator 37 high responsively to the base voltage increasing above the threshold of comparator 37 and forces output 36 low responsively to the base voltage decreasing below the threshold of comparator 37. In the preferred embodiment, comparator 37 has a hysteresis input in order to prevent false triggering of comparator 37 and false clocking of timer 38. The clock signal on output 36 is synchronized to the ac input voltage and provides one clock cycle to timer 38 for each cycle of the voltage on terminals 13 and 14, thus, for each cycle of the voltage on node 19. Since current 28 flows from input 24, the clock signal on output 36 is also synchronized to an input current. There is also a minor current path through transistors 35 and 34, but this current is small compared to the normal charge current.

Deriving the clock signal for timer 38 from the cyclic operation of the voltage received on input 24 reduces the complexity and expense of forming the time period used to initiate the maintenance charge mode thereby reducing the cost of charger 23. Using the voltage on input 24 to form the clock signal also saves pins on the semiconductor package in which charger 23 is formed thereby further reducing the costs.

After the voltage on terminal 24, thus on node 19, again becomes approximately zero at a time T2, the voltage on node 19 disables transistor 31 thereby disabling current 28. Consequently, current 28 only flows during the positive portion of the ac cycle of the input voltage.

This operation continues for each cycle of the voltage applied between terminals 13 and 14. Circuit 30 forms the normal-charge current to charge battery 20 and comparator 37 continues to increment timer 38 until timer 38 has counted a number of cycles of the voltage on terminal 24 that forces the output of timer 38 high to enable transistor 39 thereby pulling the control signal low. The normal-charge time period formed by timer 38 typically is selected to be approximately equal to at least the capacity of battery 20 divided by the normal-charge current value. For example, if the rated capacity (C) of a battery is ten ampere-hours and the normal-charge current is one ampere, then timer 38 could be formed to generate a normal-charge time period no less than about ten hours (10/1). Timer 38 generally is formed to generate a normal-charge time period that is greater than the calculated time period to ensure that battery 20 is completely charged. The value of current 28 during the normal charge mode generally is controlled by resistor 32 and transistor 34. In the exemplary embodiment illustrated in FIG. 1, current 28 only flows during the positive portion of each cycle of the voltage on input 24. Charger 23 is configured to ensure that the average value of current 28 provides the desired value of the normal-charge current. In other embodiments, current 28 may be generated for greater periods of time, for example if the voltage on input 24 is full-wave rectified. In the preferred embodiment, timer 38 is a sequential counter having twenty-two stages. For an input voltage having a sixty hertz frequency, the preferred embodiment of timer 38 counts for at least about ten hours. After timer 38 has counted the selected normal-charge time period, the output of timer 38 goes high to enable transistor 39. Enabling transistor 39 pulls the control signal and the gate of transistor 31 low and disables transistor 31 thereby disabling the normal charge current and inhibiting circuit 30 from charging battery 20 with current 28.

After circuit 30 is inhibited, charger 23 supplies a maintenance current to keep battery 20 charged until appliance 12 is decoupled from transformer 11. After circuit 30 is disabled, timer 38 keeps transistor 39 enabled. The positive going voltage on node 19 forms a current that flows through diodes 17 and 41, through transistor 35, through transistor 39 to return terminal 25, and through battery 20 back to terminal 14 as the maintenance current. The value of the maintenance current supplied through this maintenance charge loop is controlled by transistor 35.

After appliance 12 is decoupled from transformer 11, charger 23 discharges capacitor 18 to prepare charger 23 for the next charging operation. The voltage from capacitor 18 keeps timer 38 operational to enable transistor 39. Also, the voltage from capacitor 18 keeps transistor 35 enabled so that capacitor 18 is discharged by a current that flows through transistor 35, through transistor 39 to return terminal 24, and back to capacitor 18. This discharge path remains enabled until capacitor 18 is discharged to a voltage that is insufficient to keep timer 38 or transistor 35 enabled. Another discharge path may exist through resistor 46 and transistor 49. The value of resistor 46 and the size of transistor 35 may be chosen to provide the desired discharge time.

Those skilled in the art will appreciate that the clock generator of diode 33 and comparator 37 is an example of one clock generator circuit that can be used to form a clock signal for incrementing timer 38 and that other embodiments may be used as long as the embodiment provides the desired normal-charge time period. Additionally, the illustrated example embodiment of reset circuit 45 may have other embodiments as long as the reset circuit resets the timing function each time that charger 23 is mated to receive power to charge battery 20 such as from transformer 11.

Charger 23 typically is formed on a semiconductor die which is assembled into a semiconductor package. Generally the semiconductor die has no more than three external connection points, such as bonding pads, to which external connections may be formed. The three external connection points generally exclude the back side of the semiconductor die, however, in the case where the back side of the die is used to form a high current terminal of a transistor such as a vertical transistor, the three connection points include the back side of the die. In some embodiments, capacitor 18 may be assembled in the package along with the die on which charger 23 is formed. In other embodiments, the value of capacitor 18 may facilitate forming capacitor 18 on the semiconductor die with charger 23. In such a case, the semiconductor die may have only two external connection points.

In order to facilitate the functional operation of charger 23, an anode of diode 17 is connected to terminal 24 and a cathode of diode 17 is commonly connected to node 19, an anode of diode 41, a drain of transistor 31, and a cathode of ESD 29. An anode of ESD 29 is commonly connected to return terminal 24 and a cathode of diode 33. An anode of diode 33 is commonly connected to an emitter of transistor 34 and a first terminal of resistor 32. The base of transistor 34 is commonly connected to an input of comparator 37, a second terminal of resistor 32, and a source of transistor 31. A gate of transistor 31 is commonly connected to a collector of transistor 34, a source of transistor 35, and a drain of transistor 39. A source of transistor 39 is connected to return terminal 24, and a gate is connected to an output of timer 38. A drain of transistor 35 is connected to a cathode of diode 41 and a gate of transistor 35 is connected to return terminal 24. Output 36 of comparator 37 is connected to a clock input of timer 38. Comparator 37 is connected to receive power between terminal 26 and return terminal 24. A reset input of timer 38 is connected to an output of circuit 45. Timer 38 is connected to receive power between terminal 26 and return terminal 24. A source of transistor 51 is connected to the cathode of diode 41 and to terminal 26. A source of transistor 51 is commonly connected to the output of circuit 45 and a first terminal of resistor 52. A second terminal of resistor 52 is connected to a source of transistor 49 and to return terminal 24. A gate of transistor 49 is commonly connected to a drain of transistor 49 and to a cathode of diode 48. An anode of diode 48 is connected to a cathode of diode 47 which has an anode connected to a gate of transistor 51 and a first terminal of resistor 46. A second terminal of resistor 46 is connected to terminal 26. ESD 43 has a cathode connected to terminal 26 and an anode connected to return terminal 24. A first terminal of capacitor 18 is connected to terminal 26 and a second terminal of capacitor 18 is connected to return terminal 24.

Figure 3:
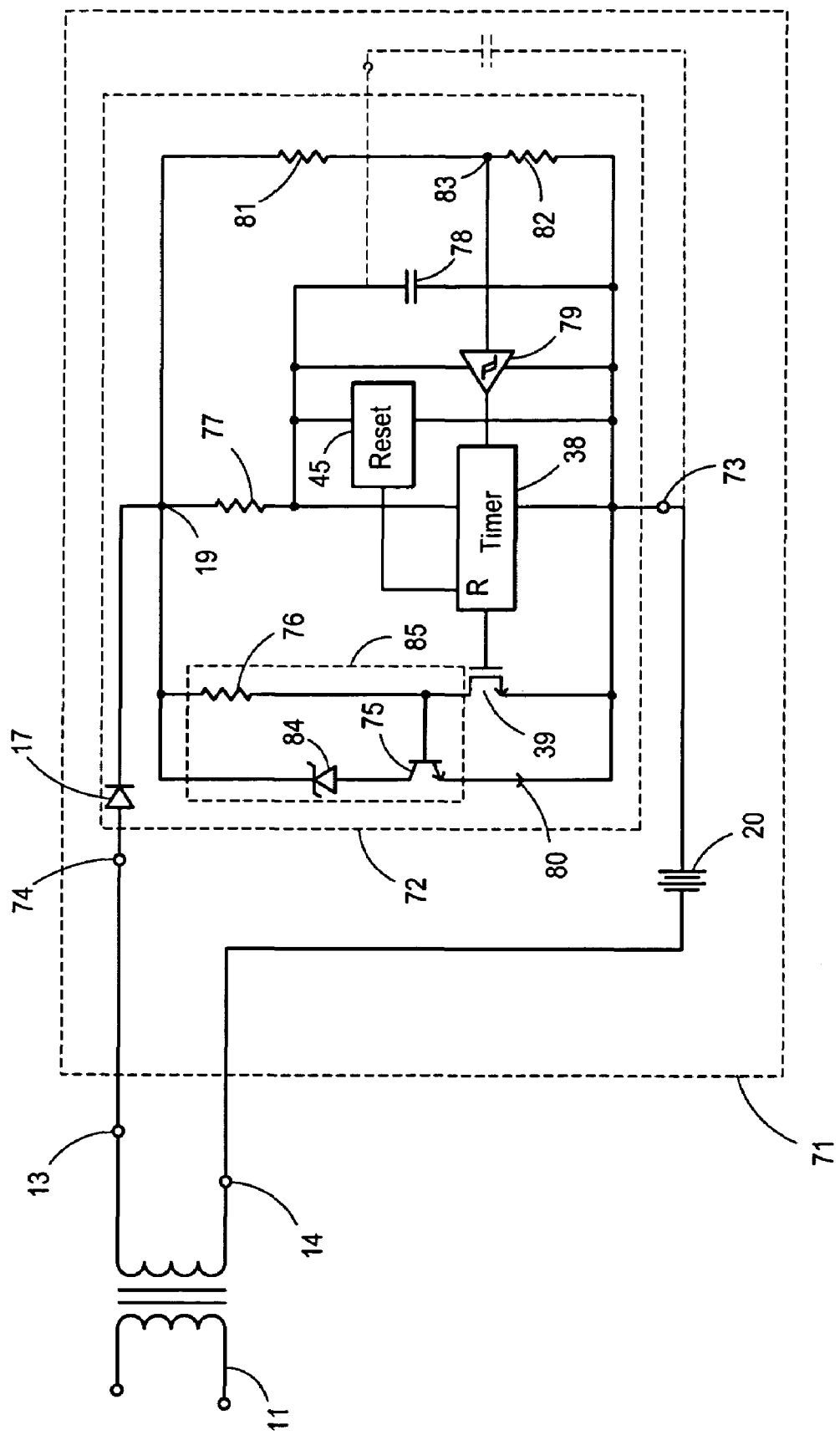
FIG. 3 schematically illustrates an alternate embodiment of the charging system of FIG. 1 in accordance with the present invention.

FIG. 3 schematically illustrates a portion of an embodiment of a charging system 70 that includes a battery charging circuit or battery charger or charger 72 that is an alternate embodiment of charger 23 described in the description of FIG. 1. A portion of system 70 is integrated into a battery-powered appliance 71 that is an alternate embodiment of appliance 12.

Charger 72 receives power for operating charger 72 and charging battery 20 between a power input terminal or input 74 and a power return terminal or return 73. Charger 72 includes a normal-charge circuit 85 that is an alternate embodiment of circuit 30 that is explained in the description of FIG. 1. Circuit 85 includes a power transistor 75 and a bias resistor 76. A capacitor 78 is used to provide an alternate operating voltage for operating charger 72 similarly to capacitor 18 of system 10. A zener diode 84 is placed in series with the collector of transistor 75 to provide sufficient voltage across circuit 85 to allow operation of the control circuits within charger 72. A resistor divider formed by resistors 81 and 82 and a comparator 79 function as a clock generator to generate a clock signal to increment timer 38. Comparator 79 generally is formed with CMOS circuits and manufacturing techniques in order to minimize the amount of power utilized by comparator 79. Comparator 79 generally has hysteresis on the inputs to minimize false triggering. A resistor 77 functions as a current limiter to limit the amount of current used to charge or discharge capacitor 78.

Capacitor 78 is discharged when appliance 71 is mated to terminals 13 and 14 and current begins flowing through diode 17 and resistor 77 to charge capacitor 78. The output of reset circuit 45 is low and holds timer 38 reset while capacitor 78 is charging. Since timer 38 is reset, the output is low and transistor 39 is disabled. After capacitor 78 is charged past the threshold voltage of circuit 45, the output of circuit 45 goes high and releases timer 38 to begin counting. After capacitor 78 is charged, as the value of the voltage on node 19 begins to increase during the ac cycle of the voltage applied between terminals 13 and 14, resistor 76 provides a bias current that enables transistor 75 allowing a normal charge current 80 to flow through diode 17, through transistor 75 to return terminal 73, and to battery 20 in order to charge battery 20 with current 80. The value of current 80 has a waveshape that follows the shape of the positive portion of plot 55 illustrated in FIG. 2.

Resistors 81 and 82 form a voltage divider that divides the voltage on node 19 down to a value that is compatible with the input threshold voltage of comparator 79 on a node 83. As the value of the voltage on node 83 increases above the threshold voltage of comparator 79, the output of comparator 79 goes high and as the value of the voltage on node 83 decreases below the threshold voltage of comparator 79 the output of comparator 79 goes low, thus, the output of comparator 79 forms a clock signal for clocking timer 38 that is synchronized to the cycle of the voltage between terminals 13 and 14. Comparator 79 typically has a Schmitt trigger input to prevent false triggering as the voltage on node 83 passes through the threshold voltage of comparator 79.

The cycle of charging battery 20 with current 80 and incrementing timer 38 continues for each cycle of the voltage between terminals 13 and 14 until timer 38 has counted the number of cycles required to force the output of timer 38 high. The high from timer 38 enables transistor 39 thereby pulling the control signal low, placing a short circuit across the base-emitter junction of transistor 75, and disabling transistor 75. Disabling transistor 75 inhibits charger 72 from supplying normal charge current 80 to battery 20. After timer 38 has timed to the desired normal-charge time period, charger 72 supplies a maintenance current to keep battery 20 charged. With transistor 75 no longer conducting, the voltage is allowed to rise on capacitor 78. The rising voltage, through resistor 77, keeps the voltage applied to comparator 79, through resistors 81 and 82, higher than the threshold voltage of comparator 79 thereby preventing it from clocking timer 38. Although there is operating voltage still applied to timer 38, it no longer counts and its output remains high and transistor 39 remains enabled. With transistor 39 enabled, current flows through diode 17, through resistor 76 and through transistor 39, to return terminal 73 and battery 20. Current also flows through diode 17 and resistors 81 and 82 to battery 20, however, this current is negligible compared the normal-charge current and the maintenance current. Thus, charger 72 provides two paths for the maintenance current that is used to keep battery 20 charged. The value of resistors 81 and 82 are selected to provide the proper signal at node 83 for triggering comparator 79 in addition to a value that assist in providing the maintenance current. The value of resistor 76 is chosen to provide the proper bias current for transistor 75 to supply the desired value for normal charge current 80. This value of resistor 76 also assists in providing the maintenance current for battery 20.

After appliance 71 is decoupled from transformer 11, charger 72 discharges capacitor 78 through resistor 77, through resistors 81 and 82, and through resistor 76 and transistor 39.

Charger 72 typically is formed on a semiconductor die which is assembled into a semiconductor package. Generally, the semiconductor die for such an embodiment has no more than two attachment points. However, in some embodiments the value of capacitor 18 may be too large to be formed on the semiconductor die, thus, capacitor 18 may be external to charger 72 as illustrated by the dashed lines in FIG. 3. For such an embodiment, capacitor 78 may be assembled into a semiconductor package along with the die on which charger 72 is formed. Generally, the semiconductor die for such an embodiment has no more than three attachment points.

In order to implement the functionality of charger 72, the anode of diode 17 is connected to terminal 74 and the cathode is connected to node 19. A first terminal of resistor 77 is commonly connected to node 19, a first terminal of resistor 76, a cathode of Zener diode 84, and a first terminal of resistor 81. An anode of Zener diode 84 is connected to the collector of transistor 75. An emitter of transistor 75 is commonly connected to return terminal 73 and the source of transistor 39. The drain of transistor 39 is commonly connected to a base of transistor 75 and a second terminal of resistor 76. The gate of transistor 39 is connected to the output of timer 38. The reset input of timer 38 is connected to the output of circuit 45. The power input of timer 38 is commonly connected to a second terminal of resistor 77, the power input of circuit 45, a power input of comparator 79, and a first terminal of capacitor 78. A second terminal of capacitor 78 is commonly connected to return terminal 73, a power return of comparator 79, the power return of circuit 45, and the power return of timer 38. A second terminal of resistor 81 is commonly connected to node 83, a first terminal of resistor 82, and an input of comparator 79. A second terminal of resistor 82 is connected to return terminal 73.

Figure 4:
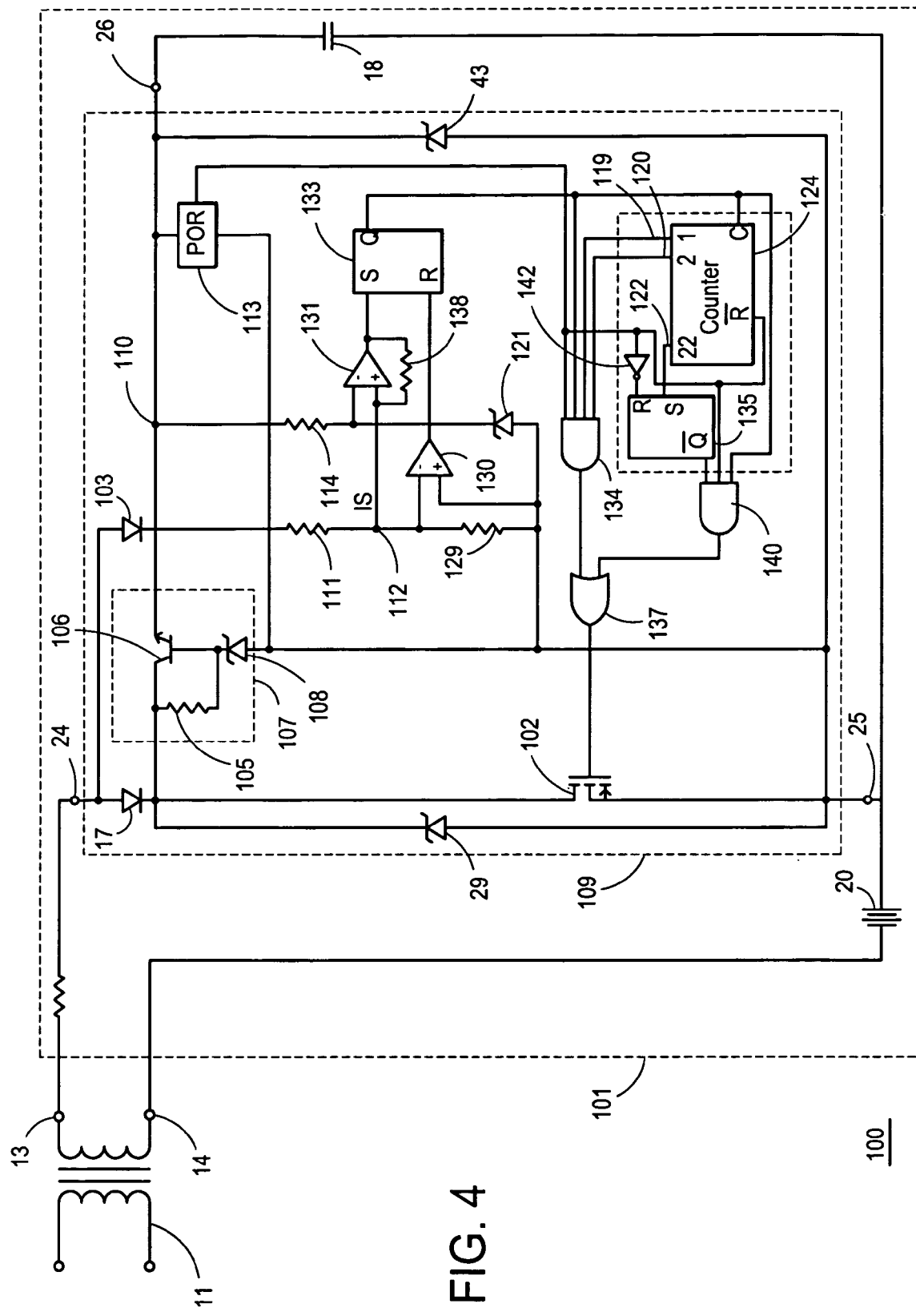
FIG. 4 schematically illustrates another alternate embodiment of the charging system of FIG. 1 in accordance with the present invention.

FIG. 4 schematically illustrates a portion of an exemplary embodiment of a charging system 100 that includes a battery charging circuit or battery charger or charger 109 that is an alternate embodiment of charger 23 that was described in the description of FIG. 1. A portion of system 100 is integrated into a battery-powered appliance 101 that is an alternate embodiment of appliance 12.

Charger 109 includes a normal-charge circuit that is an alternate embodiment of circuit 30 that is explained in the description of FIG. 1. The normal-charge circuit is configured to form the normal-charge current to rapidly charge battery 20. The normal-charge circuit includes at least a transistor 102. Charger 109 also includes an internal regulator 107, a power on reset circuit or POR 113, latches 133 and 135, comparators 130 and 131, AND gates 134 and 140, OR gate 137, an inverter 142, and a counter 124. A diode 103 prevents reverse current flow from battery 20 during negative portions of the cycle of the voltage on input 24. Counter 124 and latch 135 function to form a timer that is used to control the state of charger 109 and to switch charger 109 between the normal-charge mode and the maintenance mode similar to timer 38 shown in FIG. 1. The exemplary embodiment of regulator 107 illustrated in FIG. 4 includes a pass transistor 106, a voltage reference such as zener diode 108 configured to control the output voltage of regulator 107, and a bias resistor 105. POR 113 may be configured similarly to circuit 45 that is explained in the description of FIG. 1, however, POR 113 generally is configured with a different threshold value as will be seen further hereinafter. POR 113 assists in inhibiting the charging current until there is sufficient power to operate charger 109. Comparators 130 and 131 are used to generate a clock (CLK) signal that is used for clocking counter 124 to assist in generating the normal-charge time period. As will be seen further hereinafter, charger 109 pulses transistor 102 in both the normal-charge mode and the maintenance mode in order to charge battery 20.

Figure 5:
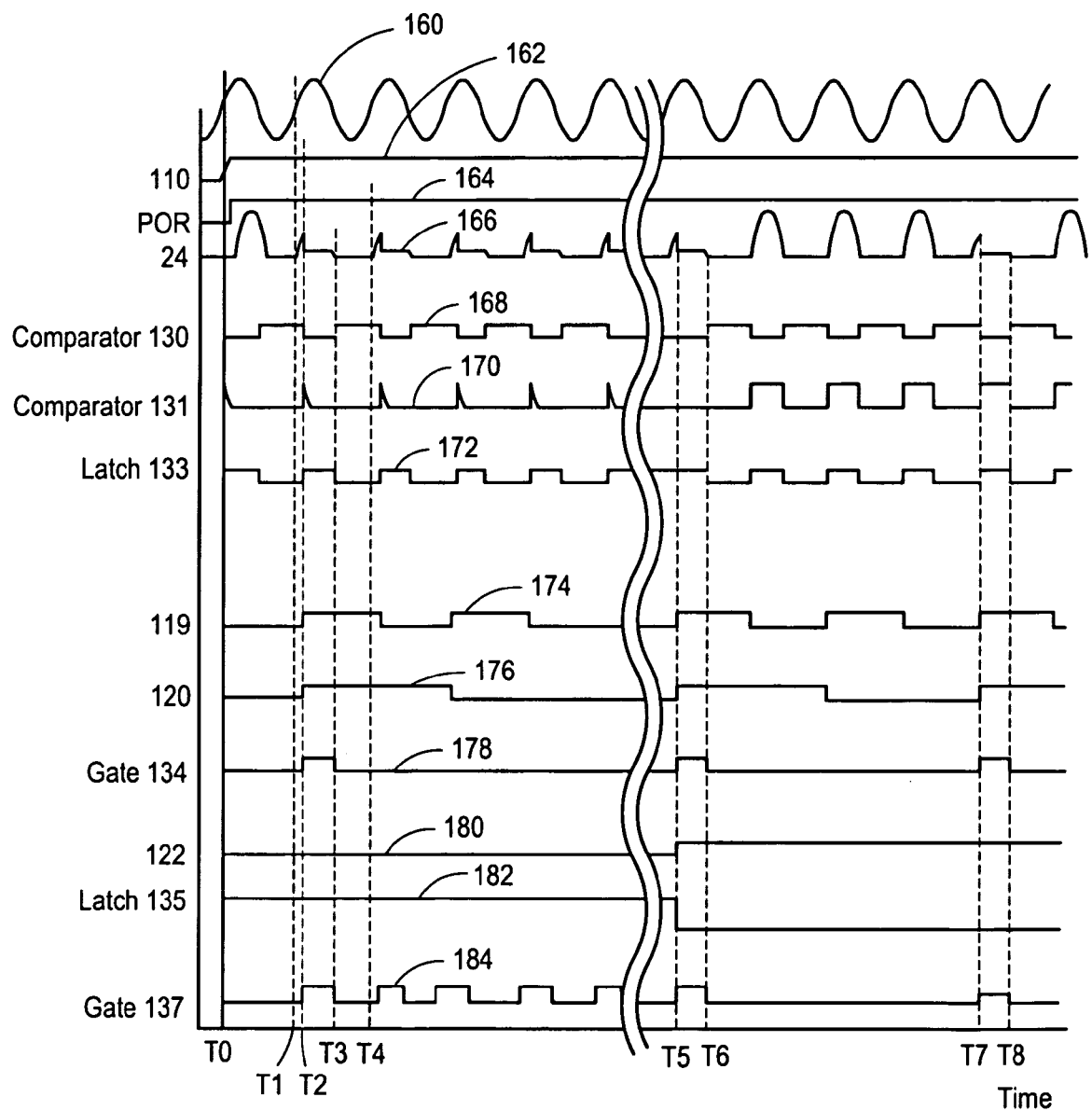
FIG. 5 is a graph having plots of signals at various points of the charging system of FIG. 4 in accordance with the present invention.

FIG. 5 is a graph illustrating plots of signals at various points of system 100 and charger 109. The abscissa indicates time and the ordinate indicates increasing value of the signal of each plot.

A plot 160 illustrates the voltage between terminals 13 and 14. A plot 162 illustrates the voltage at node 110; a plot 164 illustrates POR; a plot 166 illustrates the voltage at input 24; a plot 168 illustrates the output of comparator 130; a plot 170 illustrates the output of comparator 131; a plot 172 illustrates a Q output of latch 133; a plot 174 illustrates an output 119 of counter 124; a plot 176 illustrates an output 120 of counter 124; a plot 178 illustrates the output of gate 134; a plot 180 illustrates an MSB output 122 of counter 124; a plot 182 illustrates a Q bar output of latch 135; and a plot 184 illustrates the output of gate 137. At the bottom of the graph are noted times T0 through T8. Times between T0 and T5 illustrate the signals during the normal-charge time period or normal-charge mode and times after T5 illustrate the signals during the maintenance time period or maintenance mode.

Prior to appliance 101 being mated to terminals 13 and 14, capacitor 18 is initially discharged, an internal operating voltage on node 110 is substantially at the voltage of return 25, and the output of POR 113 is substantially at the voltage of return 25. After mating appliance 101 to terminals 13 and 14, the low value of POR indicates that charger 109 is in a startup period. The low from POR 113 holds counter 124 reset. The low from POR 113 also forces the reset input of latch 135 high, and forces the output of gates 134 and 140 low to ensure that transistor 102 remains disabled during the start-up period until the voltage on node 110 is sufficient for operating charger 109. As the input voltage on input 24 begins to increase, current begins flowing through diode 17 and transistor 106 to begin charging capacitor 18. When the voltage on node 110 rises to a first value that greater than the threshold of POR 113, the output of POR 113 is asserted to indicate that the elements of charger 109 my begin operating. The threshold of POR 113 generally is selected to be at least greater than a minimum value that ensures reliable operation of the logic elements of charger 109. In the preferred embodiment, the threshold voltage of POR 113 is approximately five volts (5 V) but may be other values in other embodiments.

As the input voltage continues to increase, transistor 106 continues to charge capacitor 18 until the input voltage reaches a value that is approximately equal to the threshold voltage of regulator 107. In the exemplary embodiment of regulator 107, the threshold voltage is approximately equal to the zener voltage of diode 108 minus the Vbe of transistor 106. In the preferred embodiment, the voltage of diode 108 is approximately 5.6 volts and the Vbe of transistor 106 is about 0.6 volts, thus, the threshold voltage is about five volts (5 V). Once the input voltage reaches the threshold voltage of regulator 107, charger 109 has charged capacitor 18 to a voltage approximately equal to the threshold voltage of regulator 107. Thus, regulator 107 limits the maximum voltage applied to the internal control circuitry of charger 109.

As the input voltage is charging capacitor 18 and even when the POR signal is low, the outputs of comparators 130 and 131 may be switching. Resistors 111 and 129 form an input sense signal (IS) at a node 112 that is representative of the instantaneous value and waveform of the input voltage on input 24. Comparators 130 and 131 receive the IS signal and use it to assist in forming the CLK signal responsively to the input voltage. Thus, the CLK signal has a frequency that is substantially equal to the frequency of the input voltage. The output of comparator 131 is forced high responsively to the input voltage increasing to a value that is no less than a threshold value of comparator 131. In the exemplary embodiment illustrated in FIG. 4, the threshold value is established by a reference voltage formed by a zener diode 121 and a resistor 114. In combination with the voltage divider of resistors 111 and 129, the threshold of comparator 131 corresponds to an input voltage of around 6 volts. As is well known in the art, a variety of circuits may be used to form a reference voltage that sets the threshold of comparator 130. The positive going output of comparator 131 sets latch 133 forcing the Q output and the CLK signal to counter 124 high. Because POR is still low, the CLK signal does not clock counter 124. The output of comparator 130 goes high responsively to the input voltage decreasing to a value that is no greater than a threshold value of comparator 130. The threshold voltage of comparator 130 is established by an intentional input offset voltage of the input stage of comparator 130. The input offset voltage typically is about fifty (50) millivolts. The positive going output of comparator 130 resets latch 133 forcing the Q output and the CLK signal to counter 124 low to prepare counter 124 for the next positive CLK edge. Thus, the CLK signal is a pulse waveform that occurs during most of the positive portion of each input cycle that appears at input 24 thereby clocking counter 124. In the preferred embodiment, the threshold values of comparators 130 and 131 are selected to be approximately 0.05 and 1.2 volts, respectively, and are representative of respective input voltage values of approximately 0.25 volts and six volts (6 V).

Charging of battery 20 begins after POR is asserted as illustrated just after time T0. Approximately at time T0 POR going high releases counter 124 to begin counting responsively to the CLK signal, thus responsively to the input voltage, and also releases gates 134 and 140 to be controlled by the output of counter 124 and latch 135. As the next cycle of the input voltage cycle begins going positive, as illustrated just prior to a time T1, the output of comparator 130 goes low, allowing comparator 131 to set latch 133 when the input rises to 6 volts at time T2. The high from the Q output of latch 133 increments counter 124 and also forces the output of gates 140 and 137 high thereby enabling transistor 102 to begin charging battery 20 with the normal-charge current. Enabling transistor 102 forces the collector of transistor 106 to substantially the value of return 25 thereby disabling transistor 106 and regulator 107. Thus, capacitor 18 begins supplying power to operate charger 109. Note that enabling transistor 102 also clamps input 24 to a lower voltage approximately equal to the drop across transistor 102 plus the drop of diode 17 as illustrated by plot 170 just after time T2. The lower voltage at input 24 forces the output of comparator 131 low, see plot 170, which has no effect on latch 133. Thus, the output of comparator 131 is a pulse. Current also flows through the voltage sensing circuit of resistors 111 and 129 and forms a portion of the normal-charge current, but this is negligible compared to the normal-charge current supplied by transistor 102. Charger 109 continues charging battery 20 during this cycle of the input voltage until the value of the input voltage decrease to value represented approximately by the threshold voltage of comparator 130 as illustrated near a time T3. The decreasing value of the input voltage forces the output of comparator 130 high to reset latch 133. The low Q output of latch 133 forces the output of gates 140 and 137 low thereby disabling transistor 102. Capacitor 18 continues to supply power to operate charger 109 as the input voltage goes through the negative portion of the input voltage cycle.

As the value of the input voltage again goes positive for the next cycle of the input voltage as illustrate just prior to a time T4, regulator 107 again is enabled as the input voltage reaches a value no less than the threshold voltage of regulator 107. Regulator 107 again begins charging capacitor 18 until the value of the input voltage is no less than the threshold voltage of comparator 131 which forces the output of comparator 131 high. The high from comparator 131 sets latch 133 which again clocks counter 124 and forces the output of gates 140 and 137 high to enable transistor 102 and disable regulator 107. Enabling transistor 102 again begins charging battery 20 and disables regulator 107.

This cycle of operation continues until latch 133 has clocked counter 124 a sufficient number of times to count to the normal-charge time period. The cycle of the input voltage that increments counter 124 to the end of the normal-charge time period, forces the most significant bit or output (MSB) of counter 124 high. The high from counter 124 sets latch 135 forcing the Q bar output low thereby asserting the control signal that controls the operating mode of charger 109 and setting charger 109 into the maintenance mode. In the preferred embodiment, counter 124 is a sequential counter having twenty-two stages. For an input voltage having a sixty hertz frequency, counter 124 counts for at least about ten hours.

In the maintenance mode, charger 109 forms a second current or the maintenance current to keep battery 20 charged. In this maintenance mode, transistor 102 is enabled to charge battery 20 for a one cycle of a plurality of cycles of the input voltage thereby averaging the charging current over a number of cycles to reduce the average current supplied to charge battery 20 thereby forming the maintenance current. In the preferred embodiment, charger 109 enables transistor 102 one out of every four cycles of the input voltage, thus, current flows through transistor 102 during one-fourth of the input cycles thereby forming the maintenance current. In this preferred embodiment, the maintenance current averages to twenty-five percent (25%) of the normal-charge current. Once counter 124 sets latch 135 to form the control signal, latch 135 stays set as long as appliance 101 is coupled to terminals 13 and 14. Thus, the control signal from the Q bar output of latch 135 remains low forcing the output of gate 140 low. However, comparators 130 and 131 continue to operate during the maintenance mode and cause latch 133 to generate the CLK signal for each cycle of the input voltage. The CLK signal continues to clock counter 124. Gate 134 decodes the two least significant bits of counter 124 to provide an output signal that is high for one of every four CLK cycles. Gate 134 also receives the CLK signal from latch 133 during each cycle. Thus, gate 134 forces the output of gate 137 high to enable transistor 102 for one cycle of each four cycles of the input voltage. It should be noted that regulator 107 and comparators 130 and 131 operate the same in both the normal-charge mode and the maintenance mode. Charger 109 continues operating in the maintenance mode until appliance 101 is disconnected from the power source at terminals 13 and 14.

Those skilled in the art will appreciate that other values for the maintenance current can be obtained by using other gating schemes and counter arrangements. For example, using a counter similar to counter 124 and adding the output of the third LSB form the output of counter 124 to the input of gate 134 would cut the duty ratio in the maintenance mode from about twenty-five percent (25%) to about twelve and one-half percent (12.5%). Additionally, diode 17 may be replaced by a bridge thereby enabling transistor 102 and incrementing counter 124 twice for each cycle of the input voltage.

The maintenance mode is illustrated after time T5 in FIG. 5. At time T5 counter 124 reaches the state where output 122 goes high as shown in plot 180. By design of the counter, this occurs at the end of the normal-charge time period, usually 10 hours or so. Approximately at time T6, conduction of transistor 102 ceases because the output of comparator 130 resets latch 133 causing the output of gate 134 to go low. Since the other input of OR gate 137 is already low, the output of gate 137 goes low turning off transistor 102. Transistor 102 stays off until about time T7 when all inputs to gate 134 are again high. At time T8, conduction ceases as it did at time T6.

Although the illustrated embodiment of charger 109 is configured to form the second current for only a portion of a number of cycles of the input voltage, those skilled in the art will realize that charger 109 may be configured to form the second current for a different number of cycles or may be configured to form the second current on every cycle of the input voltage. For example, in the normal mode transistor 102 may be enabled for a first portion of each cycle to provide the normal charging current for that cycle, and during the maintenance mode transistor 102 may be enabled for a second portion of each cycle to provide the maintenance charging current for that cycle. For such an implementation, the second portion is much less than the first portion. Additionally, those skilled in the art will realize that that the ac frequency may be full wave rectified and that the cycle for which transistor 102 is enabled may be each half-wave of the full ac cycle.

In order to assist in facilitating this functionality for charger 109, an anode of diode 17 is commonly connected to input 24 and to a first terminal of resistor 111. A second terminal of resistor 111 is commonly connected to a non-inverting input of comparator 131, a first terminal of resistor 138, an inverting input of comparator 130, and a first terminal of resistor 129. A second terminal of resistor 129 is connected to return 25, to a non-inverting input of comparator 130, and to an anode of diode 121. A cathode of diode 121 is commonly connected to an inverting input of comparator 131 and a first terminal of resistor 114. A second terminal of resistor 114 is connected to node 110. The output of comparator 131 is commonly connected to a second terminal of resistor 138 and the set input of latch 133. The reset input of latch 133 is connected to the output of comparator 130. The Q output of latch 133 is commonly connected to a first input of gate 134, a clock input of counter 124, and a first input of gate 140. Output 119 of counter 124 is connected to a second input of gate 134. Output 120 of counter 124 is connected to a third input of gate 134. Output 122 of counter 124 is connected to the set input of latch 135. A fourth input of gate 134 is commonly connected to the output of POR 113, an input of inverter 142, and a second input of gate 140. An output of inverter 142 is connected to the reset input of latch 135. The Q bar output of latch 135 is connected to a third input of gate 140. The output of gate 140 is connected to a first input of gate 137. The output of gate 134 is connected to a second input of gate 137. The output of gate 137 is connected to a gate of transistor 102. A source of transistor 102 is connected to return 25 and a drain is commonly connected to the cathode of diode 17 and a first input of regulator 107. A collector of transistor 106 is commonly connected to the first input of regulator 107 and a first terminal of resistor 105. A second terminal of resistor 105 is commonly connected to the base of transistor 106 and the cathode of diode 108. An anode of diode 108 is connected to return 25. An emitter of transistor 106 is commonly connected to an output of regulator 107, to node 110, and to terminal 26. POR 113 is connected between node 110 and return 27 to receive power.

Figure 6:
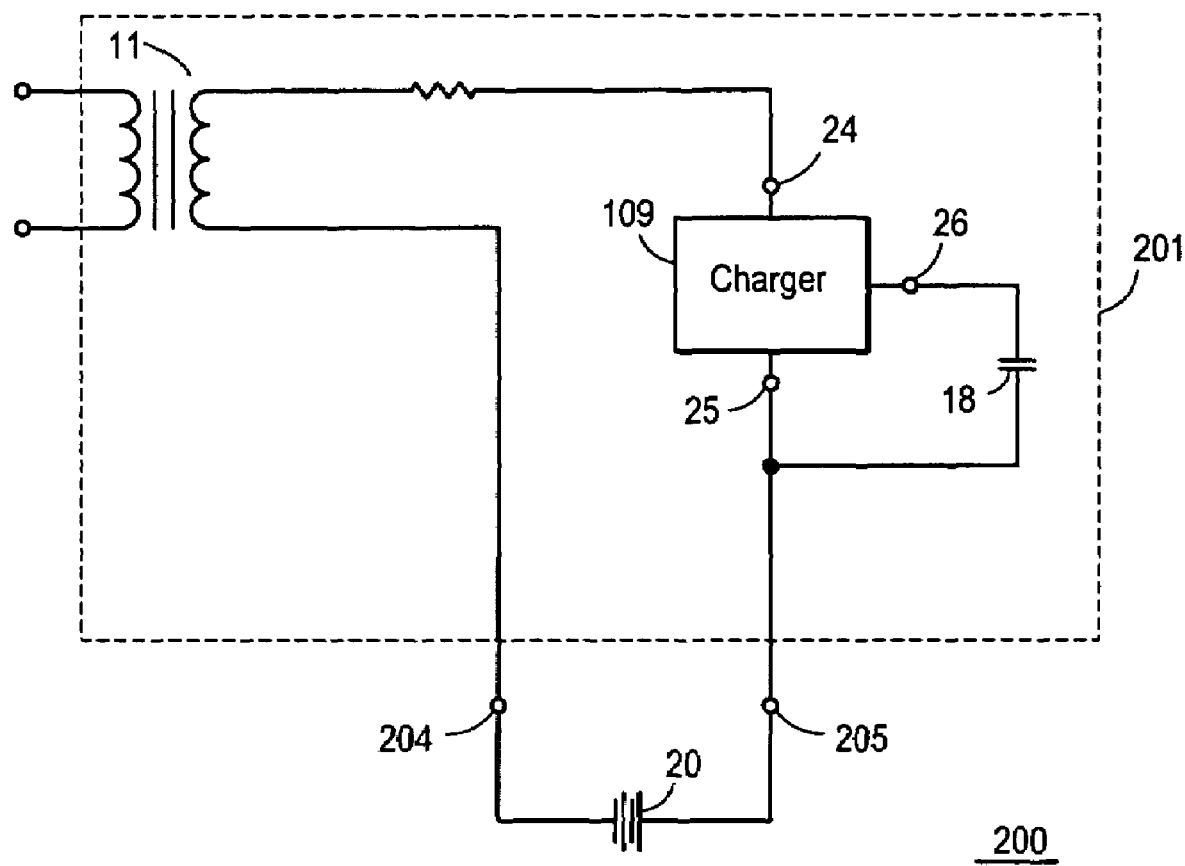
FIG. 6 schematically illustrates a further alternate embodiment of the charging system of FIG. 1 in accordance with the present invention.

FIG. 6 schematically illustrates a portion of an exemplary embodiment of a charging system 200 that is an alternate embodiment of system 100 that is explained in the description of FIGS. 4 and 5. System 200 includes charger 109 and transformer 11 that are configured as a battery charger unit 201. Unit 201 is not a portion of an appliance such as appliances 12, 71, and 101, but is configured to receive and to charge battery 20 once battery 20 is mated to terminals 204 and 205 of unit 201. Battery 20 is subsequently removed from unit 201 and used to power appliances not shown in FIG. 6. Once battery 20 is removed from unit 201, another battery 20 may be mated to terminals 204 and 205 and charged by unit 201. Unit 201 generally includes charger 109, transformer 11, and capacitor 18. Unit 201 is often referred to as a charger cup because it generally has a recessed area to accept battery 20.

Upon mating battery 20 to terminals 204 and 205, charger 109 charges battery 20 as described hereinbefore. Upon removing battery 20 from unit 201, charger 109 quickly discharges capacitor 18 to configure charger 109 to charge another battery 20. Charger 109 typically discharges capacitor 18 through transistor 49 and resistor 46 and also through transistor 35. Another discharge path may also exist through POR 113. The discharge time generally is no greater than about one second and preferably is no greater than about one-half a second.

Those skilled in the art will appreciate that chargers 23 and 72 could also be configured in a charging unit such as unit 201.

Figure 7:
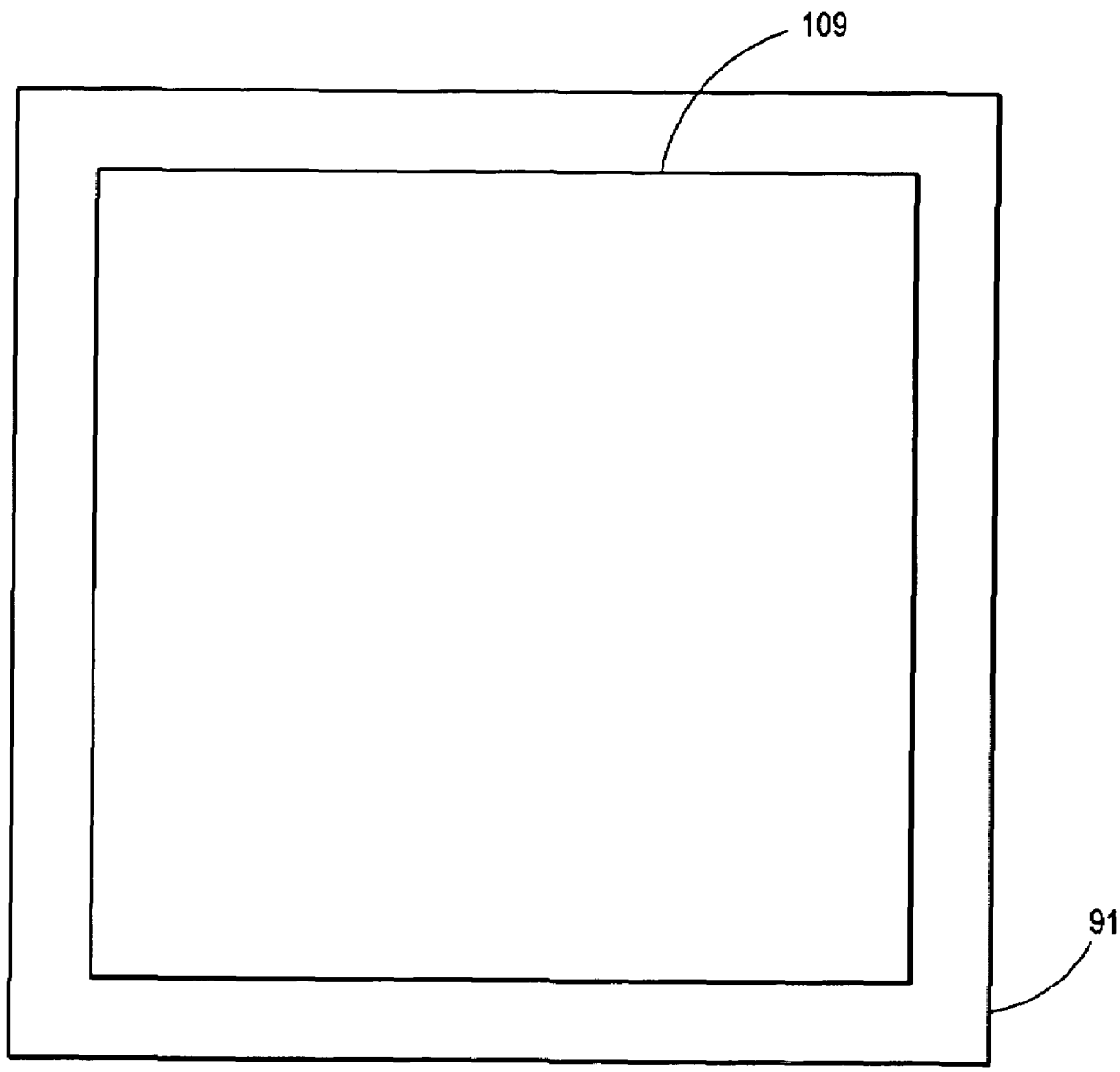
FIG. 7 schematically illustrates an enlarged plan view of a semiconductor device that includes a portion of the charging system of FIG. 4 in accordance with the present invention.

FIG. 7 schematically illustrates an enlarged plan view of a portion of an embodiment of a semiconductor device 90 that is formed on a semiconductor die 91. Any of chargers 23, 72, or 109 may be formed on die 91. The exemplary embodiment illustrates charger 109 formed on die 91. Die 91 may also include other circuits that are not shown in FIG. 7 for simplicity of the drawing. Any of chargers 23, 72, or 109 and device 90 are formed on die 91 by semiconductor manufacturing techniques that are well known to those skilled in the art.

Figure 8:
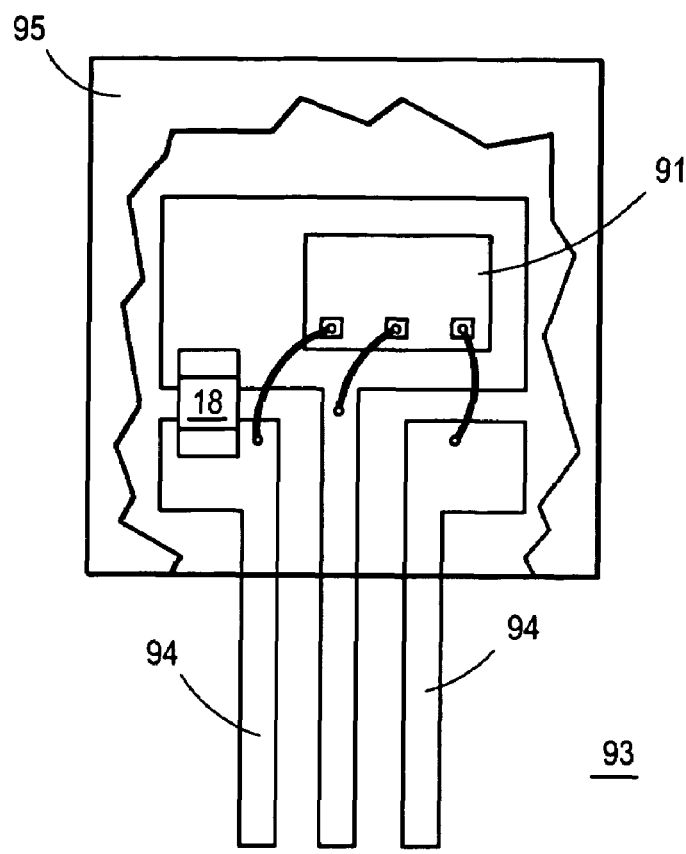
FIG. 8 schematically illustrates a cut-away view of a semiconductor package having a portion of the charging system of FIG. 4 in accordance with the present invention.

FIG. 8 schematically illustrates a cut-away view of a semiconductor package 93 having three terminals in which die 91 is assembled. Package 93 includes terminals 94 and a package body 95. Examples of suitable packages for package 93 include packages commonly referred to as a TO-92, TO-220, TO-126, and TO-247. Those skilled in the art will appreciate that other packages such as surface mount types of packages may also be used. For the embodiment illustrated in FIG. 8, capacitor 18 is external to die 91 and is assembled in package 93 along with die 91. Any of chargers 23, 72, or 109 may be formed on die 91 and assembled in package 93. In other embodiments, charger 72 may be formed on die 91 and assembled in package 93 along with capacitor 78.

Figure 9:
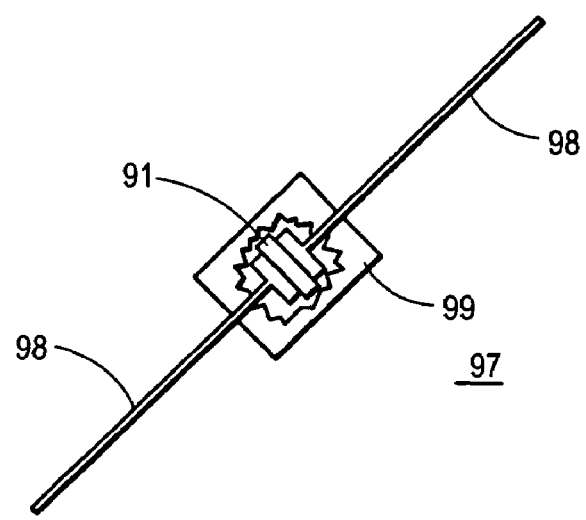
FIG. 9 schematically illustrates a cut-away view of another semiconductor package having a portion of the charging system of FIG. 4 in accordance with the present invention.

FIG. 9 schematically illustrates a cut-away view of a semiconductor package 97 having two terminals in which die 91 is assembled. Package 97 includes terminals 98 and a package body 99. Package 97 often is referred to as an axial lead package by those skilled in the art. For the embodiment illustrated in FIG. 9, capacitor 18 is formed on die 91 along with charger 23. In other embodiments, either charger 72 and capacitor 78 or charger 109 and capacitor 18 may be formed on die 91 and assembled in package 97.

In view of all of the above, it is evident that a novel device and method is disclosed. Included, among other features, is forming the battery charger to charge the battery for a first time period with a first value of current and to sequentially switch to charging the battery with a second current responsively to the first time period expiring. Using one current for a period of time ensures that the battery is charged and switching to a second current facilitates decreasing the power dissipation of the charging system thereby improving the efficiency of the charging system. Using a single die and a small low cost package minimizes the cost of the battery charger.

While the invention is described with specific preferred embodiments, it is evident that many alternatives and variations will be apparent to those skilled in the semiconductor arts. More specifically the invention has been described for a particular NPN, N-channel, and P-channel transistor structures, although other transistor types may also be used. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a battery charger comprising:
configuring the battery charger to provide a first current having a first value for a first time period and to sequentially provide a second current after providing the first current wherein the battery charger has no greater than three external connection points.

2. The method of claim 1 wherein configuring the battery charger to provide the first current having the first value for the first time period includes configuring a timer to determine the first time period and to change the first current to the second current.

3. The method of claim 2 wherein configuring the timer to determine the first time period and to change the first current to the second current includes configuring the battery charger to receive an input voltage having a frequency and to increment the timer responsively to the frequency of the input voltage.

4. The method of claim 1 wherein configuring the battery charger to provide the first current having the first value for the first time period includes configuring the battery charger to use the first current to form the first time period.

5. The method of claim 1 wherein configuring the battery charger to provide the first current having the first value for the first time period includes configuring the battery charger to receive an input voltage having a frequency and use the frequency of the input voltage to form the first time period.

6. The method of claim 1 wherein configuring the battery charger to provide the first current having the first value for the first time period and to sequentially provide the second current includes configuring the battery charger to receive an input voltage having a frequency and to form the second current by forming the first current for only a portion of a number of cycles of the input voltage.

7. The method of claim 1 wherein configuring the battery charger to provide the first current having the first value for the first time period and to sequentially provide the second current includes configuring the battery charger to receive an input voltage having a frequency and to form the first current for only a portion of each cycle of the input voltage.

8. A method of forming a battery charger comprising:
configuring the battery charger to receive an input voltage having a first frequency;
configuring the battery charger to generate a normal charge current to charge a battery for a first time period, and to sequentially reduce the normal charge current to a maintenance current responsively to the first time period expiring; and
configuring the battery charger to determine the first time period responsively to cycles of the input voltage.

9. The method of claim 8 wherein configuring the battery charger to determine the first time period responsively to cycles of the input voltage includes configuring the battery charger to generate a clock signal from the input voltage and coupling a digital timer to receive the clock signal.

10. The method of claim 8 wherein configuring the battery charger to determine the first time period responsively to cycles of the input voltage includes configuring the battery charger to generate a clock signal from an input current and coupling a digital timer to receive the clock signal.

11. The method of claim 8 wherein configuring the battery charger to generate the normal charge current to charge the battery for the first time period includes configuring the battery charger to enable a transistor to provide the normal charge current and to disable the transistor responsively to the first time period expiring.

12. The method of claim 8 wherein configuring the battery charger to generate the normal charge current to charge the battery for the first time period includes configuring the battery charger to form the first time period to be no less than approximately ten hours.

13. The method of claim 8 further including configuring the battery charger to be assembled in a semiconductor package having no more than three external connection points.

14. A method of forming a battery charger comprising:
configuring the battery charger to receive an input voltage having a first frequency;
configuring the battery charger to provide a first current to charge a battery for a first time period and to sequentially provide a second current to charge the battery after providing the first current; and
configuring the battery charger to synchronize the first current to the first frequency.

15. The method of claim 14 wherein configuring the battery charger to synchronize the first current to the first frequency includes configuring the battery charger to form the first current for a portion of each cycle of the input voltage.

16. The method of claim 14 wherein configuring the battery charger to provide the first current having the second frequency to charge the battery for the first time period and to sequentially provide the second current includes configuring the battery charger to form the second current for only a portion of one cycle of a plurality of cycles of the input voltage.

17. A battery charger comprising:
a first charging path operably coupled to provide a first current to charge a battery for a first time period;
a second charging path operably coupled to provide a second current to charge the battery after the first time period; and
a timer circuit coupled to receive a clock signal and responsively form the first time period, the timer circuit operably coupled to enable the battery charger to couple the first current to the first charging path for the first time period and to enable the battery charger to couple the second current to the second charging path after the first time period has expired.

18. The battery charger of claim 17 wherein the timer circuit is operably coupled to enable the battery charger to couple the second current to the second charging path independently of a value of a voltage of the battery.

19. The battery charger of claim 17 wherein the first charging path includes a first transistor coupled to provide the first current and coupled to be disabled responsively to the first time period expiring.

20. The battery charger of claim 17 wherein the second charging path includes a second transistor coupled to provide the second current from an ac input voltage.

21. The battery charger of claim 17 further including a reset path configured to reset the battery charger after charging the battery to prepare for charging another battery.

22. A method of forming a battery charger comprising:
configuring the battery charger to receive an input voltage having a first frequency; and
configuring the battery charger to form an alternate operating voltage for the battery charger responsively to a first portion of a cycle of the input voltage, and form a first current to charge a battery for a first time period responsively to a second portion of the cycle of the input voltage, wherein the battery charger disables the first current responsively to the first time period expiring and independently of a voltage value of the battery.

23. The method of claim 22 wherein configuring the battery charger to form the alternate operating voltage responsively to the first portion of the cycle of the input voltage includes configuring the battery charger to charge a capacitor during the first portion of the cycle of the input voltage and to use the capacitor to form the first current responsively to the second portion of the cycle of the input voltage.

24. A method of forming a battery charger comprising:
configuring the battery charger to receive an input voltage having a first frequency;
configuring the battery charger to provide a first current to charge a battery for a first time period and to sequentially provide a second current to charge the battery after the first time period expires and independently of a voltage value of the battery; and
configuring the battery charger to form the second current for only a portion of a number of cycles of the input voltage.

25. The method of claim 24 wherein configuring the battery charger to form the second current for only the portion of the number of cycles of the input voltage includes configuring the battery charger to form the first current for the portion of the number of cycles of the input voltage.

26. The method of claim 24 wherein configuring the battery charger to form the second current for only the portion of the number of cycles of the input voltage includes configuring the battery charger to form the second current for only a portion of one cycle of a plurality of cycles of the input voltage.

27. The method of claim 24 wherein configuring the battery charger to form the second current for only the portion of the number of cycles of the input voltage includes configuring the battery charger to synchronize the first current and the second current to the first frequency.

28. A method of forming a battery charger comprising:
configuring the battery charger to receive an input voltage having a frequency; and
configuring the battery charger to provide a first current to charge a battery for a first portion of cycles of the input voltage and to sequentially provide a second current to charge the battery for a second portion of cycles of the input voltage after providing the first current for a first time period wherein the second portion is less than the first portion, including configuring the battery charger to synchronize the first current and the second current to the frequency.

* * * * *